US010785420B2

(12) United States Patent
Hamasaki (10) Patent No.: US 10,785,420 B2
(45) Date of Patent: Sep. 22, 2020

(54) IMAGING DEVICE AND CAMERA FOR MINIMIZING A DIGITAL GAIN VALUE TO BE MULTIPLIED AND SUPPRESSING NOISE

(71) Applicant: Panasonic Intellectual Property Management Co., Ltd., Osaka (JP)

(72) Inventor: Takeshi Hamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/416,205

(22) Filed: May 18, 2019

(65) Prior Publication Data

US 2019/0273874 A1  Sep. 5, 2019

Related U.S. Application Data

(63) Continuation of application No. PCT/JP2018/025956, filed on Jul. 10, 2018.

(30) Foreign Application Priority Data

Jul. 13, 2017 (JP) .................................. 2017-136688

(51) Int. Cl.
| *H04N 5/243* | (2006.01) |
| *H04N 5/232* | (2006.01) |
| *H04N 5/235* | (2006.01) |
| *H04N 5/353* | (2011.01) |
| *H04N 5/357* | (2011.01) |
| *H04N 5/374* | (2011.01) |
| *H04N 5/378* | (2011.01) |

(Continued)

(52) U.S. Cl.
CPC .......... *H04N 5/243* (2013.01); *H04N 5/2353* (2013.01); *H04N 5/2354* (2013.01);
(Continued)

(58) Field of Classification Search
CPC ........ H04N 5/243; H04N 5/378; H04N 5/374; H04N 5/23212; H04N 5/2353;
(Continued)

(56) References Cited

U.S. PATENT DOCUMENTS

| 4,647,976 A | 3/1987 | Nakagaki |
| 2002/0171102 A1 | 11/2002 | Shizukuishi |

(Continued)

FOREIGN PATENT DOCUMENTS

| JP | 60-38988 | 2/1985 |
| JP | 2002-280537 | 9/2002 |

(Continued)

OTHER PUBLICATIONS

International Search report (ISR) (with English translation) and Written Opinion (WO) dated Sep. 18, 2018 in International Application No. PCT/JP2018/025956.

*Primary Examiner* — Twyler L Haskins
*Assistant Examiner* — Akshay Trehan
(74) *Attorney, Agent, or Firm* — Renner, Otto, Boisselle & Sklar, LLP (57) ABSTRACT

An imaging device includes: an imaging element that outputs an image signal in a nondestructive manner; an image processor that performs predetermined processing on the outputted image signal to generate image data; and a controller that controls the image processor. Under control of the controller, the image processor reads out image signals from the imaging element a plurality of times within one exposure period, calculates a target gain value based on a target level and an added signal, and multiples the added signal by the target gain value to generate the image data. The target level is calculated based on a signal level of a last read-out image signal in one exposure period. The added signal being obtained by adding up the image signals read out the plurality of times.

8 Claims, 10 Drawing Sheets

(52) U.S. Cl.
CPC ..... *H04N 5/23212* (2013.01); *H04N 5/23287* (2013.01); *H04N 5/353* (2013.01); *H04N 5/357* (2013.01); *H04N 5/374* (2013.01); *H04N 5/378* (2013.01)

(58) Field of Classification Search
CPC ...... H04N 5/2354; H04N 5/353; H04N 5/357; H04N 5/23287
See application file for complete search history.

(56) References Cited

U.S. PATENT DOCUMENTS

2007/0041063 A1 2/2007 Kitada et al.
2013/0327950 A1* 12/2013 Niwa ................... H04N 5/3745
 250/395
2014/0016022 A1 1/2014 Yoshioka et al.
2015/0281553 A1 10/2015 Ogura
2016/0182843 A1 6/2016 Endo
2016/0337600 A1* 11/2016 Honda ................... H04N 5/238

FOREIGN PATENT DOCUMENTS

| | | |
|---|---|---|
| JP | 2002-290814 | 10/2002 |
| JP | 2004-15291 | 1/2004 |
| JP | 2008-042180 | 2/2008 |
| JP | 2014-22828 | 7/2012 |
| JP | 2014-22828 A | 2/2014 |
| JP | 2016-122199 | 7/2016 |
| JP | 2017-163260 | 9/2017 |
| JP | 2018-107734 | 7/2018 |
| WO | 2015/045828 | 4/2015 |

* cited by examiner

FIG. 5
MOVEMENT OF OBJECT DURING PERIOD FROM TIME 0 TO TIME T

A: RESULT OF IMAGE CAPTURING
FROM TIME 0 TO TIME 0.5T (b)

B: RESULT OF IMAGE CAPTURING
FROM TIME 0 TO TIME T (b)

C=B-A: RESULT OF IMAGE CAPTURING
FROM TIME 0.5T TO TIME T (b)

A+B-0.5D=1.5B: RESULT OF
COMBINING (A+B) AND D

XIIb                                                    XIIb h20

IMAGING DEVICE AND CAMERA FOR MINIMIZING A DIGITAL GAIN VALUE TO BE MULTIPLIED AND SUPPRESSING NOISE

CROSS REFERENCE TO RELATED APPLICATIONS

This application is a U.S. continuation application of PCT International Patent Application Number PCT/JP2018/025956 filed on Jul. 10, 2018, claiming the benefit of priority of Japanese Patent Application Number 2017-136688 filed on Jul. 13, 2017, the entire contents of which are hereby incorporated by reference.

BACKGROUND

1. Technical Field

The present disclosure relates to an imaging device and a camera which capture an image.

2. Description of the Related Art

An imaging device that captures an image by using an image sensor has heretofore been known (for example, see Japanese Unexamined Patent Application Publication No. 2008-042180).

Japanese Unexamined Patent Application Publication No. 2002-280537 discloses, as a MOS image sensor capable of global shutter driving, a configuration for writing electric charges generated in a photodiode into a nonvolatile memory transistor, and also discloses an image sensor capable of reading out data in a nondestructive manner.

As the image sensor capable of reading out data in a nondestructive manner, an example in which a floating gate amplifier (FGA) is applied to a CCD image sensor. Similarly, an example in which the FGA is applied to a CMOS image sensor is described in Japanese Unexamined Patent Application Publication No. 2004-015291.

International Patent Publication No. WO 2015/045828 discloses an organic CMOS image sensor capable of reading out data in a nondestructive manner.

SUMMARY

In a general imaging device, a sufficient amount of light cannot be obtained under a low-illuminance environment, and thus it is necessary to electrically amplify (hereinafter referred to as "gain up") signals.

During this amplification, it is desirable to perform a gain-up using an analog circuit (hereinafter referred to as "multiplication of an analog gain"). Meanwhile, when the gain is insufficient even after the gain of the analog circuit reaches a maximum value, it is necessary to perform a gain-up using a digital circuit (hereinafter referred to as "multiplication of a digital gain"). However, the multiplication of the digital gain causes a deterioration in bit accuracy of a video signal and an increase in quantization noise along with the deterioration, which leads to a problem that unnecessarily large noise is generated.

Accordingly, the present disclosure is directed to providing an imaging device and a camera which are capable of minimizing a digital gain value to be multiplied and suppressing generation of noise as compared with a related art.

In accordance with an aspect of the present disclosure, there is provided an imaging device including: an imaging element that outputs an image signal in a nondestructive manner; an image processor that performs predetermined processing on the image signal generated by the imaging element to generate image data; and a controller that controls the image processor, wherein, under control of the controller, the image processor reads out image signals from the imaging element a plurality of times within one exposure period, calculates a target gain value based on a target level and an added signal, and multiples the added signal by the target gain value to generate the image data, the target level being calculated based on a signal level of a last read-out image signal in the one exposure period, the added signal being obtained by adding up the image signals read out the plurality of times.

In accordance with another aspect of the present disclosure, there is provided a camera including: the above-described imaging device; and an optical system including at least one optical element that focuses external light on the imaging element.

An imaging device and a camera according to the present disclosure can capture an image in which noise is suppressed as compared with a related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

In accordance with an aspect of the present disclosure, there is provided an imaging device including: an imaging element that outputs an image signal in a nondestructive manner; an image processor that performs predetermined processing on the image signal generated by the imaging element to generate image data; and a controller that controls the image processor, wherein, under control of the controller, the image processor reads out image signals from the imaging element a plurality of times within one exposure period, calculates a target gain value based on a target level and an added signal, and multiples the added signal by the target gain value to generate the image data, the target level being calculated based on a signal level of a last read-out image signal in the one exposure period, the added signal being obtained by adding up the image signals read out the plurality of times.

According to this configuration, an added signal, which is obtained by adding up a plurality of image signals read out within one exposure period, is multiplied by a target gain value. Accordingly, unlike in the case of multiplying one image signal by a target gain value, deterioration in bit accuracy can be suppressed. If the level of deterioration in bit accuracy is high, noise is more likely to occur in an image. However, since the deterioration in bit accuracy can be suppressed, an image in which noise is suppressed can be captured.

In accordance with another aspect of the present disclosure, there is provided a camera including: the above-described imaging device; and an optical system including at least one optical element that focuses external light on the imaging element.

According to this configuration, it is possible to provide a camera capable of obtaining the same advantageous effects as those of the above-described imaging device.

Hereinafter, certain exemplary embodiments are described in greater detail. It should be noted that the embodiments described below are generic and specific examples of the present disclosure. Numerical values, shapes, materials, constituent elements, arrangement positions and the connection configuration of the constituent elements, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations, although such constituent elements are not necessarily required to achieve the object of the present disclosure.

Embodiment 1

A configuration and operation of an imaging device according to Embodiment 1 will be described below.

[1. Configuration]

Figure 1:
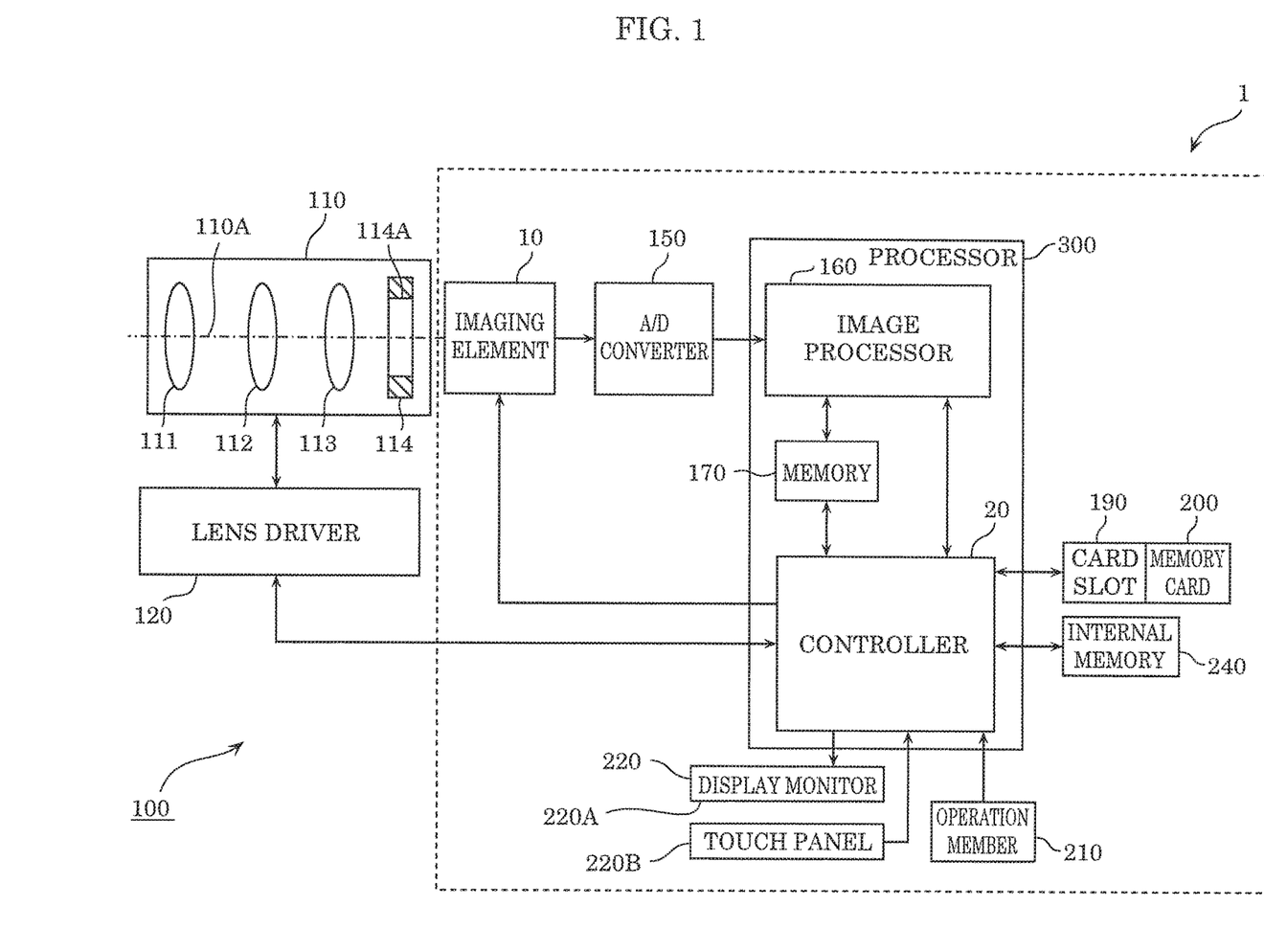
FIG. 1 is a block diagram illustrating a configuration of a camera according to an embodiment.

FIG. 1 is a block diagram illustrating a configuration of camera 100 according to Embodiment 1.

Camera 100 includes optical system 110, lens driver 120, and imaging device 1.

Optical system 110 includes one or more lenses that focus external light on imaging element 10 of imaging device 1. Specifically, optical system 110 includes zoom lens 111, hand shake correction lens 112, focus lens 113, and diaphragm 114. Zoom lens 111 is caused to move along optical axis 110A, thereby enabling an object image to be enlarged or reduced. Further, focus lens 113 is caused to move along optical axis 110A, thereby enabling focusing of the object image to be adjusted. Furthermore, hand shake correction lens 112 is movable within a plane perpendicular to optical axis 110A of optical system 110. Hand shake correction lens 112 is moved in a direction in which shaking of camera 100 is cancelled out, thereby making it possible to reduce the effect of shaking of camera 100 on captured images. In addition, diaphragm 114 includes aperture section 114A located on optical axis 110A. The size of aperture section 114A is adjusted automatically or according to a user's setting, to thereby adjust the amount of light to be transmitted.

Lens driver 120 includes a zoom actuator that drives zoom lens 111, a hand shake correction actuator that drives hand shake correction lens 112, a focus actuator that drives focus lens 113, and a diaphragm actuator that drives diaphragm 114. Further, lens driver 120 controls the above-described zoom actuator, focus actuator, hand shake correction actuator, and diaphragm actuator.

Imaging device 1 includes imaging element 10, A/D converter 150, processor 300, card slot 190, internal memory 240, operation member 210, and display monitor 220.

Imaging element 10 is an imaging element, such as an organic MOS image sensor, which is capable of outputting an image signal in a nondestructive manner. Imaging element 10 captures an image of an object image formed by optical system 110 and generates an analog image signal as an analog signal. Imaging element 10 performs various operations such as exposure, transfer, and electronic shutter.

A/D converter 150 performs analog gain-up on the analog image signal generated by imaging element 10, and converts the analog image signal into a digital image signal that is a digital signal.

Processor 300 executes processing on the image signal generated by imaging element 10, and executes control processing on the entirety of camera 100. Specifically, processor 300 includes image processor 160, controller 20, and memory 170.

Image processor 160 performs various processing on the image signal generated by imaging element 10, generates image data to be displayed on display monitor 220, and generates image data to be stored in memory card 200. For example, image processor 160 performs various processing, such as gamma correction, white balance correction, and blemish correction, and a digital gain-up depending on a target level and a target gain value to be described below, on the image signal generated by imaging element 10. Further, image processor 160 compresses the image signal generated by imaging element 10 in accordance with a compression format or the like based on H.264 standards or MPEG2 standards. Image processor 160 can be implemented by a DSP, a microcomputer, or the like.

Controller 20 is a controller that controls the entirety of camera 100. In other words, controller 20 is a controller that controls image processor 160. Controller 20 can be implemented by a semiconductor element or the like. Controller 20 may be configured using only hardware, or may be implemented by a combination of hardware and software. Controller 20 can be implemented by a microcomputer or the like. Note that controller 20 can also function as image processor 160.

Memory 170 functions as a work memory for image processor 160 and controller 20. Memory 170 can be implemented by, for example, a DRAM, an SRAM, or a ferroelectric memory. Memory 170 may be electrically connected to an outside of processor 300.

Card slot 190 detachably holds memory card 200. Card slot 190 can be mechanically or electrically connected to memory card 200. Memory card 200 includes a nonvolatile flash memory or a ferroelectric memory therein, and can store data, such as an image file, which is generated by image processor 160.

Internal memory 240 includes a nonvolatile flash memory and a ferroelectric memory. Internal memory 240 stores a control program and the like for controlling the entirety of camera 100.

Operation member 210 is a generic term used to refer to user interfaces that receive an operation from a user. Operation member 210 includes, for example, a directional pad and a decision button, which receive an operation from a user.

Display monitor 220 includes screen 220A capable of displaying images indicated by the image data generated by imaging element 10, and images indicated by the image data read out from memory card 200. Further, display monitor 220 can also display various menu screens for performing various settings for camera 100 on screen 220A. Touch panel 220B is arranged on screen 220A of display monitor 220. Touch panel 220B can receive various touch operations when the user touches touch panel 220B. An instruction indicated by a touch operation on touch panel 220B is sent to controller 20 and various processing are carried out.

[2. Operation]

An operation of digital camera 100 having the configuration as described above will be described. Imaging element 10 has a function of outputting data in a nondestructive manner. The function of outputting data in a nondestructive manner is a function that enables output of an image signal in a nondestructive manner within an exposure period. Hereinafter, an operation of digital camera 100 using the function of outputting data in a nondestructive manner of imaging element 10 will be described.

Image processor 160 reads out image signals a plurality of times within one exposure period of imaging element 10 under control of controller 20. Specifically, image processor 160 controls the read-out timing of imaging element 10 to read out image signals a plurality of times within one exposure period.

Figure 2:
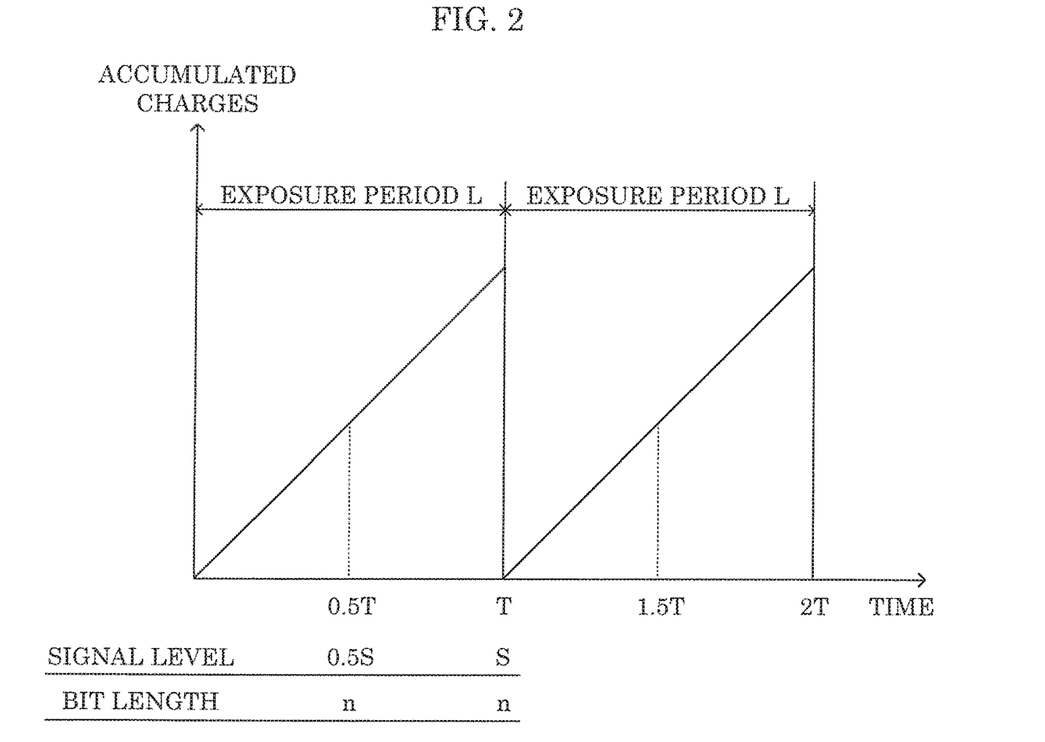
FIG. 2 is an explanatory diagram illustrating a read-out timing of an image signal according to the embodiment.

FIG. 2 is an explanatory diagram illustrating a read-out timing of an image signal according to Embodiment 1. This embodiment illustrates a case where image signals are read out trice within one exposure period L. The exposure period L is, for example, 1/60 seconds. To simplify the explanation, this embodiment is described assuming that imaging element 10 receives object light with a constant (not variable) light reception amount within exposure period L. As illustrated in FIG. 2, image processor 160 reads out image signals twice from imaging element 10 within one exposure period L. The read-out timing is a point (time T) in exposure period L and a divided point (time 0.5T) obtained after equally dividing exposure period L. At this time, accumulated charges of pixels in imaging element 10 increase in proportion to time. Accordingly, assuming that the signal level of the second read-out image signal is represented by S, the signal level of the first read-out image signal is 0.5S. On the other hand, the bit length of the first image signal is the same value (n) as that of the second image signal.

Image processor 160 temporarily stores the image signals, which are acquired from imaging element 10 and read out twice within one exposure period L, in memory 170 every time the image signals are read out. After that, image processor 160 calculates a target gain value based on a target level calculated by the signal level of the second read-out image signal, and the added signal obtained by adding up the image signals read out twice. Image processor 160 generates image data by multiplying the added signal by the target gain value. This processing corresponds to noise reduction processing, and noise is reduced from the generated image data.

The term "target level" described herein refers to a signal level of image data to be finally expressed. The target gain value is obtained based on the ratio between the target level and the signal level of the added signal obtained by adding up the image signals read out twice.

As an example of the method of determining the target level, a method in which a target level of an n-bit signal obtained after multiplication of a digital gain is determined to be $219 \times 2^{n-8}$ so that camera 100 has an output brightness signal amplitude of 219 at eight bits when an image of a white object having a reflectance of about 90% is captured is known.

How the bit accuracy varies depending on whether image signals are added by multiplication of a digital gain will now be described by taking an example in which the target level is doubled. First, a deterioration in bit accuracy in the case of reading out the image signal only once in one exposure period L and the image signal is multiplied by the two-fold digital gain relative to the case where the image signal is multiplied by the two-fold analog gain can be obtained by Expression (1).

$$\log_2(2^{n+1}) - \log_2(2^n) = (n+1) - n = 1 \quad (1)$$

where $\log_2(2^{n+1})$ represents bit accuracy obtained when the image signal is multiplied by the two-fold analog gain, and $\log_2(2^n)$ represents bit accuracy obtained after the multiplication of the two-fold digital gain (the bit accuracy is the same as that obtained before the multiplication of the digital gain). As shown in Expression (1), a deterioration in bit accuracy is one bit in this case.

Next, as illustrated in FIG. 2, a deterioration in bit accuracy when image signals are read out twice in different exposure periods at the same exposure start time in one exposure period L can be obtained by Expression (2).

$$\log_2(2^{n+1}) - \log_2(1.5 \times 2^n) = (n+1) - (n+0.58) = 0.42 \quad (2)$$

Assuming herein that the signal level of the second read-out image signal is represented by S, the signal level of the first read-out image signal is 0.5S. Accordingly, the signal level of the added signal is 1.5S. Therefore, in Expression (2), $\log_2(2^{n+1})$ represents bit accuracy obtained by the multiplication of the two-fold analog gain, and $\log_2(1.5 \times 2^n)$ represents bit accuracy obtained after the multiplication of the (2÷1.5=4/3)-fold digital gain. As shown in Expression (2), a deterioration in bit accuracy is 0.42 bits in this case. It is known that noise generated in an image is reduced as the deterioration in bit accuracy decreases. For this reason, noise is reduced when image signals are read out a plurality of times within one exposure period L and the read-out image signals are added.

[3. Effects and the Like]

As described above, imaging device 1 according to Embodiment 1 includes: imaging element 10 that outputs an image signal in a nondestructive manner; image processor 160 that performs predetermined processing on the image signal generated by imaging element 10 to generate image data; and controller 20 that controls image processor 160. Under control of controller 20, image processor 160 reads out image signals from imaging element 10 a plurality of times within one exposure period L, calculates a target gain value based on a target level and an added signal, and multiples the added signal by the target gain value to generate the image data. The target level is calculated based on a signal level of a last read-out image signal in one exposure period L. The added signal is obtained by adding up the image signals read out the plurality of times.

According to this configuration, since the added signal, which is obtained by adding up a plurality of image signals read out within one exposure period L, is multiplied by the target gain value, the deterioration in bit accuracy can be suppressed as compared with the case of multiplying one image signal by the target gain value. Noise is more likely to be generated in an image as the deterioration in bit accuracy increases. However, an image in which noise is suppressed can be captured by suppressing the deterioration in bit accuracy.

Furthermore, image processor 160 reads out each of the image signals at a timing obtained by equally dividing one exposure period L.

According to this configuration, since a plurality of image signals is read out at the timing obtained by equally dividing exposure period L, the read-out period Tr per image signal can be easily secured at the time of reading out all image signals.

Modified Example 1

Embodiment 1 described above illustrates a case where image signals are read out twice within one exposure period L. However, the number of times of reading out image signals within one exposure period L may be three times or more. In any case, image processor 160 reads out image signals a plurality of times from imaging element 10 within one exposure period L, calculates a target gain value based on a target level calculated based on the signal level of the last read-out image signal in one exposure period L, and an added signal obtained by adding up the plurality of read-out image signals, and multiplies the added signal by the target gain value.

This Modified Example 1 illustrates a case where image signals are read out four times within one exposure period L.

Figure 3:
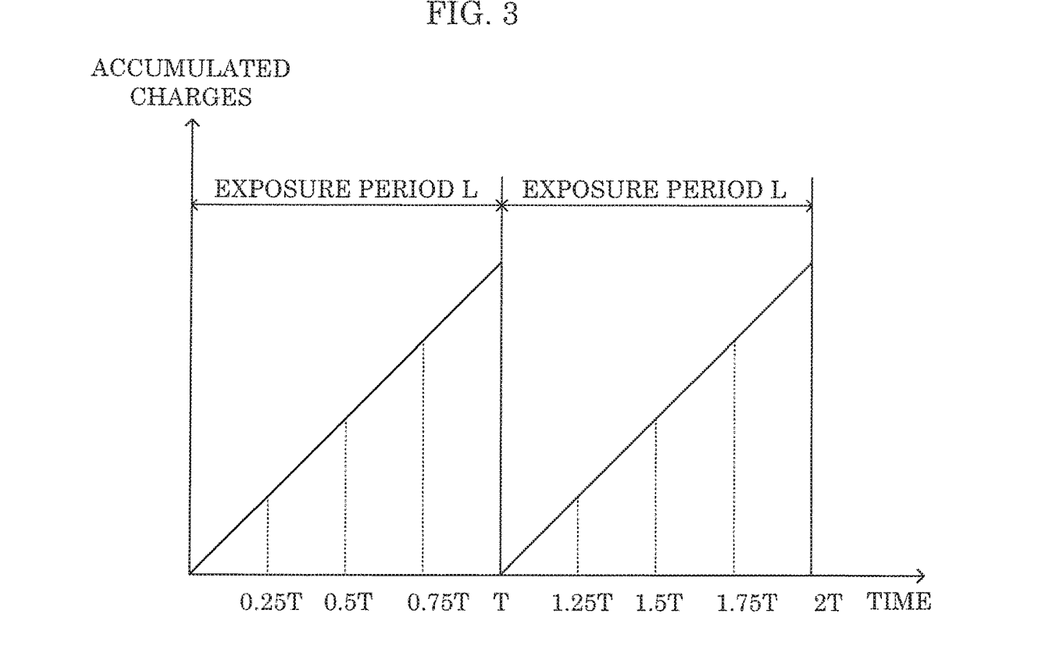
FIG. 3 is an explanatory diagram illustrating a read-out timing of an image signal according to Modified Example 1.

FIG. 3 is an explanatory diagram illustrating a read-out timing of an image signal according to Modified Example 1. As illustrated in FIG. 3, image processor 160 reads out image signals four times from imaging element 10 within one exposure period L. The read-out timing corresponds to a point (time T) in exposure period L and divided points (time 0.25T, time 0.5T, time 0.75T) obtained by equally dividing exposure period L into four sections. Specifically, also, in this case, the image signals read out each time have the same exposure start time, but have different exposure periods. Further, to simplify the explanation, this modified example is described assuming that sensor receives object light with a constant (not variable) light reception amount within exposure period L.

Image processor 160 temporarily stores the image signals, which are obtained from imaging element 10 and read out four times within one exposure period L, in a memory every time. After that, image processor 160 calculates the target gain value based on the target level calculated based on the signal level of the fourth read-out image signal, and the added signal obtained by adding up the image signals read out four times. Image processor 160 multiplies the added signal by the obtained target gain value, and amplifies the signal level of the added signal. A deterioration in bit accuracy when the target level is quadrupled can be obtained by Expression (3).

$$\log_2(2^{n+2}) - \log_2(2.5 \times 2^n) = (n+2) - (n+1.32) = 0.68 \quad (3)$$

Thus, since the image signals read out four times within one exposure period L are added, the deterioration in bit accuracy can be suppressed. The deterioration in bit accuracy can be suppressed by increasing the number of times of reading out image signals within one exposure period L. However, if the number of times of reading out image signals is increased irregularly, there is a possibility that the interval between adjacent read-out timings may be shorter than the read-out period Tr per image signal. However, since the image signals are read out at each timing obtained when the one exposure period L is equally divided, the read-out period Tr per image signal can be easily secured at the time of reading out all image signals. In other words, when one exposure period L is equally divided, it is necessary to determine the number of times of reading out image signals so that the interval between the adjacent read-out timings is prevented from being smaller than the read-out period Tr.

Modified Example 2

Embodiment 1 described above illustrates a case where one exposure period L is equally divided and image signals are read out at the divided points. However, if image signals are read out a plurality of times within one exposure period L, the read-out timing is not particularly limited. This Modified Example 2 illustrates a case where image signals are read out a plurality of times without equally dividing exposure period L.

Figure 4:
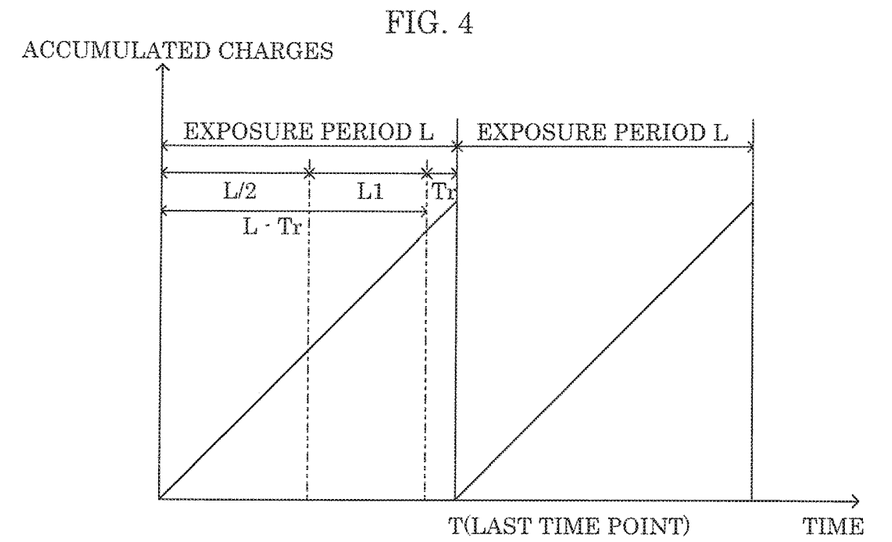
FIG. 4 is an explanatory diagram illustrating a read-out timing of an image signal according to Modified Example 2.

FIG. 4 is an explanatory diagram illustrating a read-out timing of an image signal according to Modified Example 2.

As illustrated in FIG. 4, image processor 160 reads out image signals twice within one exposure period L. Specifically, image processor 160 sets the last read-out timing in the number of times of reading out image signals within one exposure period L as a last time point in the exposure period, and sets the read-out timing other than the last read-out timing to be within period L1 equal to or longer than L/2 of the exposure period and less than L−Tr. For example, when time 0.1T is set as the read-out period Tr, the first read-out timing is set to the point L−Tr (time 0.9T) within exposure period L, and the second read-out timing is set to the last time point (time T) in the exposure period.

Thus, the last read-out timing in the number of times of read-out image signals within one exposure period L is set as the last time point in the exposure period, the read-out timing in times other than the last time is set to be half of exposure period L or more (L/2 or more) so as to fall within period L1 which is equal to or less than the difference between exposure period L and one read-out period Tr (less than L−Tr), thereby securing the read-out period Tr in the time preceding to the last time. Accordingly, the stability of reading out image signals can be enhanced.

Further, image processor 160 reads out image signals a plurality of times within period L1 which is equal to or longer than a half of exposure period L in one exposure period L (L/2 or more).

Further, the first read-out timing is preferably set to a point near the last time point in one exposure period L. For example, as illustrated in FIG. 4, a deterioration in bit accuracy when the first read-out timing is time 0.9T and the second read-out timing is T can be obtained by Expression (4).

$$\log_2(2^{n+1}) - \log_2(1.9 \times 2^n) = (n+1) - (n+0.93) = 0.07 \quad (4)$$

In this case, assuming that the signal level of the second read-out image signal is represented by S, the signal level of the first read-out image signal is 0.9S. Accordingly, the signal level of the image signal obtained after the addition is 1.9S. Therefore, in Expression (4), $\log_2(2^{n+1})$ represents bit accuracy obtained when the multiplication of the two-fold analog gain, and $\log_2(1.9 \times 2^n)$ represents bit accuracy obtained after the multiplication of the (2÷1.9=20/19)-fold digital gain. As shown in Expression (4), in this case, a deterioration in bit accuracy is 0.07 bits. Thus, the deterioration in bit accuracy can be suppressed as compared with the case of Expression (2). Therefore, the deterioration in bit accuracy can be greatly suppressed, with the result that an image in which noise is suppressed can be captured.

Note that image processor 160 may read out image signals a plurality of times within period L1. Also, in this case, it is desirable to determine each read-out timing in consideration of the read-out period Tr.

Further, image processor 160 may determine the number of times of reading out image signals within the current exposure period L based on the target gain value previously calculated. According to this configuration, image processor 160 can determine the number of times of reading out image signals within the current exposure period L based on the target gain value previously calculated, and can set an appropriate number of times of reading out image signals for the target gain value.

As the target gain value previously calculated, the target gain value obtained in the last exposure period L, or the target gain value obtained in exposure period L at the earlier stage than it may be used. Alternatively, the target gain value obtained at a timing (for example, at the time of auto focusing during still image capturing) which is different from exposure period L.

Embodiment 2

In Embodiment 1 described above, the sufficient effect of reducing noise can be obtained when an image of a still object is captured, while a problem is caused when an image of a moving object is captured. This problem will be described below.

Figure 5:
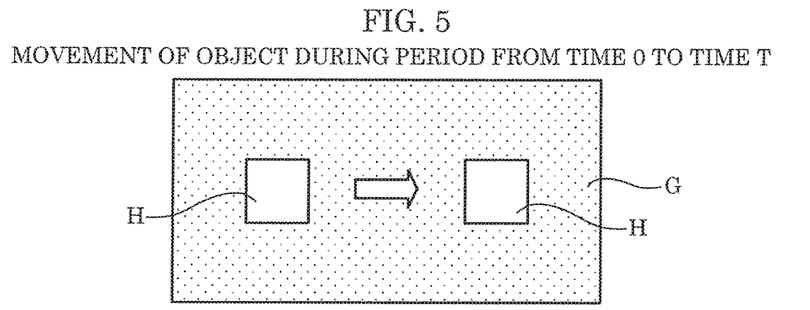
FIG. 5 is a schematic diagram illustrating a rectangular white object that moves on a background entirely colored in gray as an example of a moving object.

FIG. 5 is a schematic diagram illustrating rectangular white object H that moves on background G entirely colored in gray (indicated by dot-hatching in FIG. 5) as an example of a moving object. Assume that object H moves on background G at a constant speed in a period from time 0 to time T.

Figure 6:
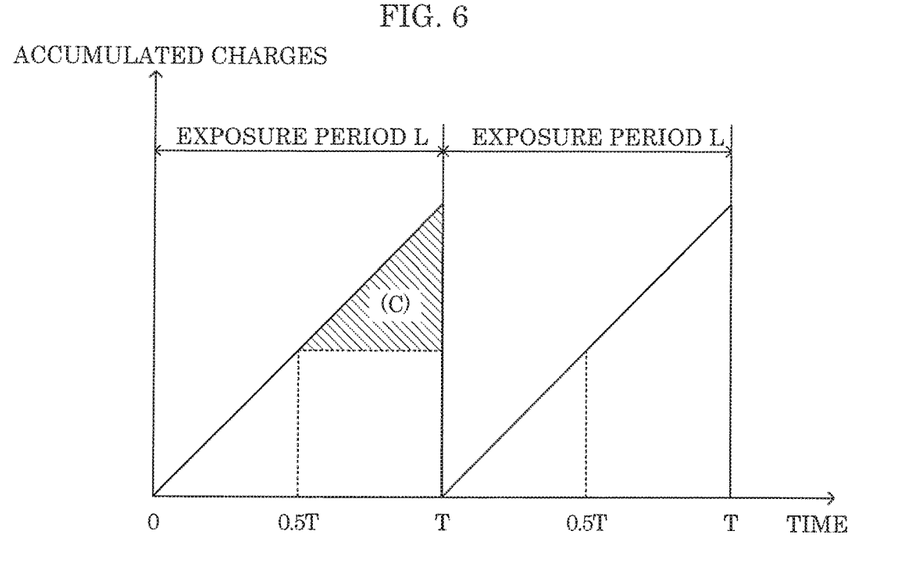
FIG. 6 is an explanatory diagram illustrating a read-out timing of an image signal according to Embodiment 2.

FIG. 6 is an explanatory diagram illustrating a read-out timing of an image signal according to Embodiment 2. FIG. 6 illustrates a drive method of imaging element 10 according to Embodiment 2, in which image signals obtained as a result of image capturing are read out at time 0.5T and time T, and the image signals read out at time 0.5T and time T are referred to as signal A and signal B, respectively.

Figure 7:
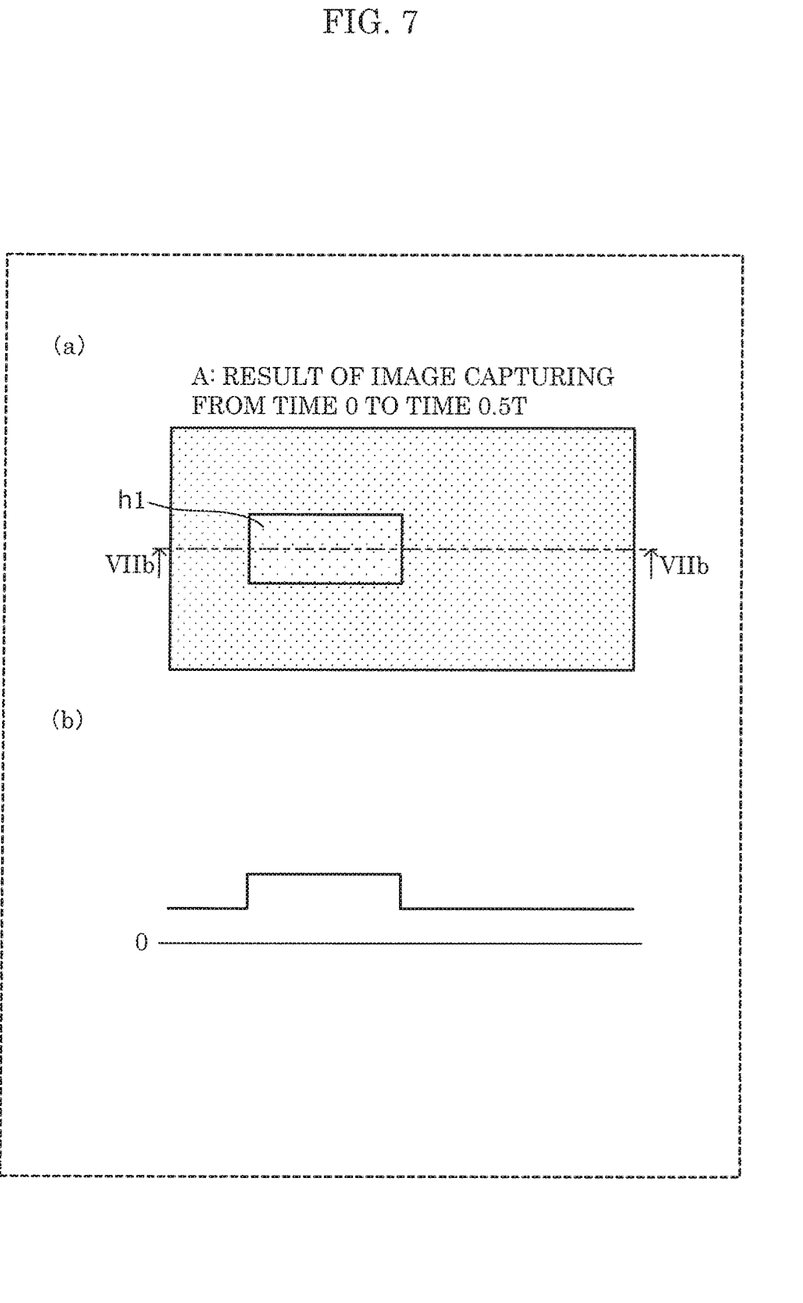
FIG. 7 is an explanatory diagram illustrating a result of image capturing during a period from time 0 to time 0.5T according to Embodiment 2.

FIG. 7 is an explanatory diagram illustrating an image capturing result during a period from time 0 to time 0.5T according to Embodiment 2. Specifically, (a) in FIG. 7 is a schematic diagram illustrating a captured image, (b) in FIG. 7 is a waveform diagram illustrating a waveform of a signal level at a section taken along a line VIIb-VIIb in the captured image. As illustrate in (a) in FIG. 7, as a result of image capturing from time 0 to time 0.5T, image signal (signal A) including still background G and movement locus h1 of object H is obtained.

Figure 8:
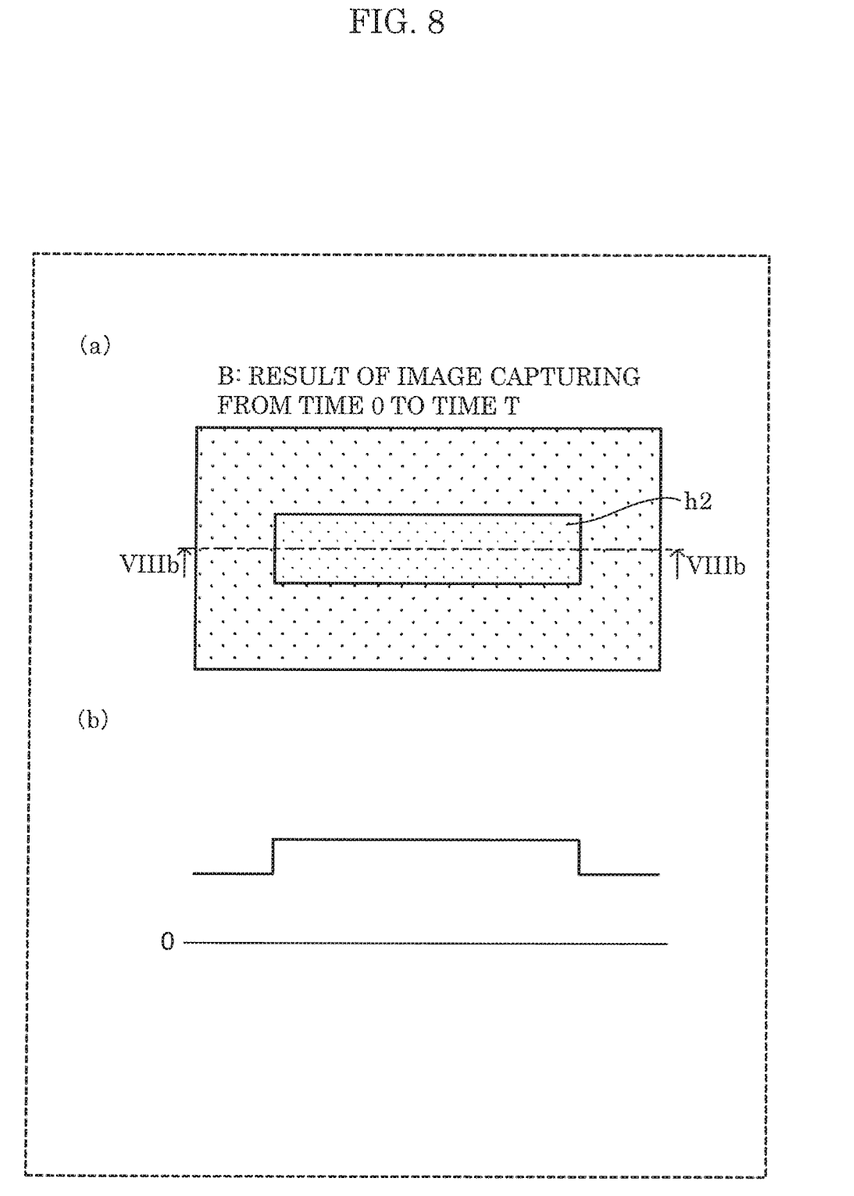
FIG. 8 is an explanatory diagram illustrating a result of image capturing during a period from time 0 to time T according to Embodiment 2.

FIG. 8 is an explanatory diagram illustrating an image capturing result in a period from time 0 to time T according to Embodiment 2. Specifically, (a) in FIG. 8 is a schematic diagram illustrating a captured image, and (b) in FIG. 8 is a waveform diagram illustrating a waveform of a signal level at a section taken along a line VIIIb-VIIIb in the captured image. As illustrated in (a) in FIG. 8, as a result of image capturing in a period from time 0 to time T, an image signal (signal B) including still background G and movement locus h2 of object H is obtained.

Figure 9:
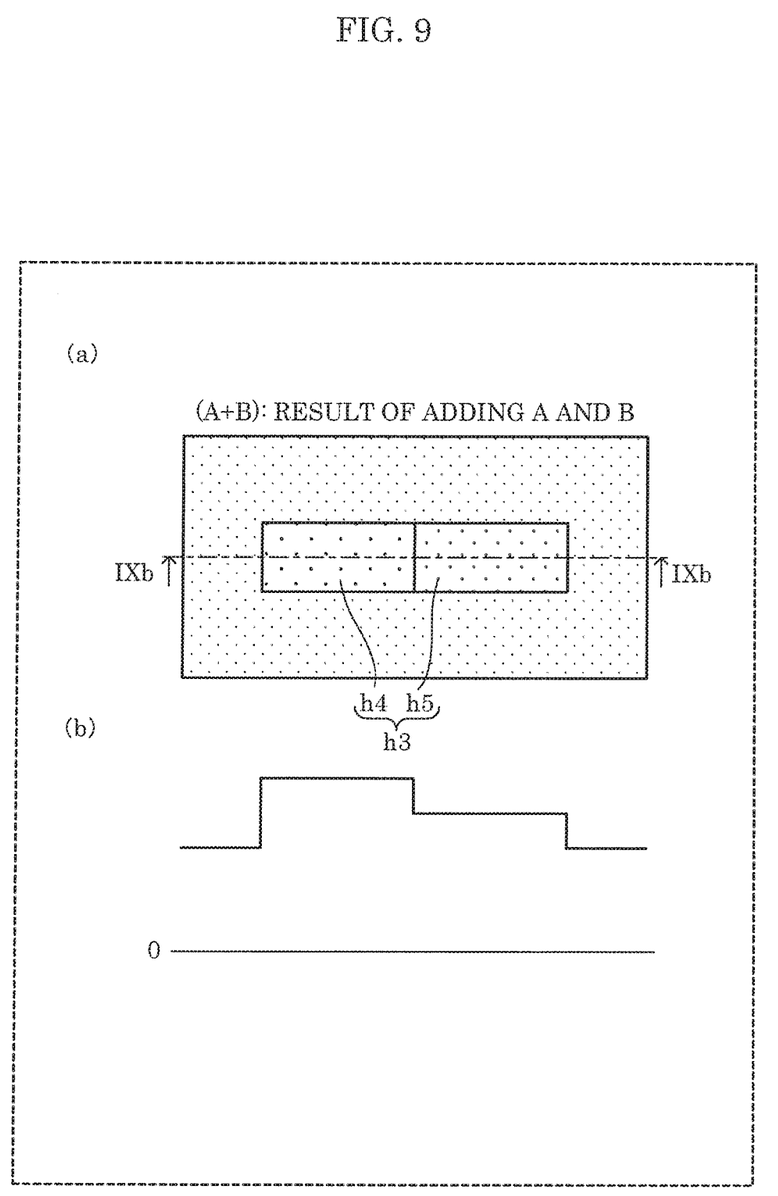
FIG. 9 is an explanatory diagram illustrating a result of adding signal A and signal B according to Embodiment 2.

FIG. 9 is an explanatory diagram illustrating a result obtained when signal A and signal B are added according to Embodiment 2. Specifically, (a) in FIG. 9 is a schematic diagram illustrating an image based on the addition result, and (b) in FIG. 9 is a waveform diagram illustrating a waveform of a signal level at a section taken along a line IXb-IXb in the image based on the addition result.

In this case, in signal (A+B) obtained by adding signal A and signal B, there is a difference between the signal level of a common area (common area h4) between signals A and B and the signal level of non-common area h5 present only in signal B on object locus h3 from time 0 to time T, which leads to a problem that the signal level of object locus h3 is discontinuous as illustrated in FIG. 9.

Accordingly, in order to solve this problem, the following processing is added to the processing performed by image processor 160.

Figure 10:
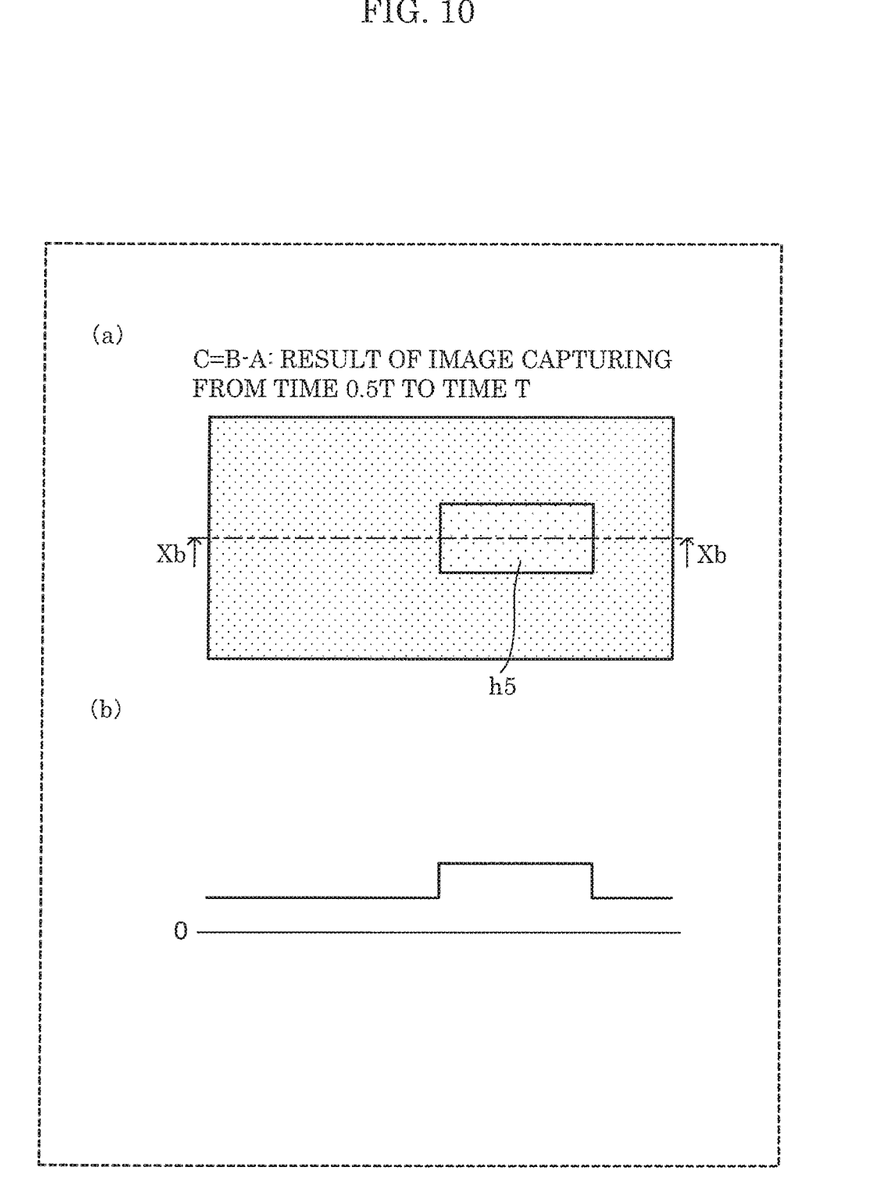
FIG. 10 is an explanatory diagram illustrating signal C obtained by subtracting signal A from signal B according to Embodiment 2.

FIG. 10 is an explanatory diagram illustrating signal C obtained by subtracting signal A from signal B according to Embodiment 2. Specifically, (a) in FIG. 10 is a schematic diagram illustrating the image based on signal C, and (b) in FIG. 10 is a waveform diagram illustrating a waveform of a signal level at a section taken along a line Xb-Xb in the image based on signal C. Signal C obtained by subtracting signal A from signal B corresponds to an output of accumulated charges as indicated by hatched area (C) in FIG. 6. In other words, signal C indicates the result of image capturing in a period from time 0.5T to time T.

Figure 11:
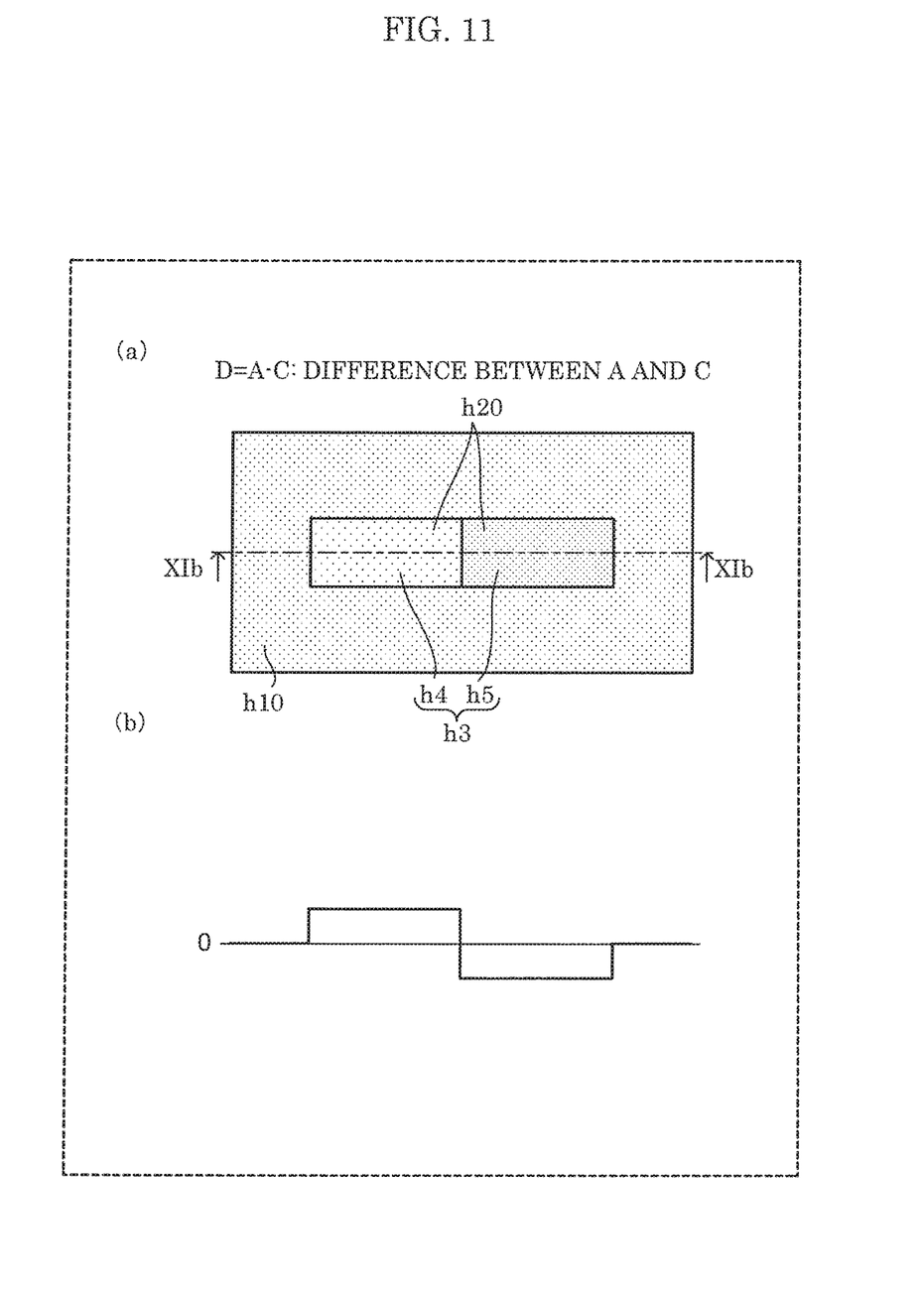
FIG. 11 is an explanatory diagram illustrating signal D obtained by subtracting signal C from signal A according to Embodiment 2.

FIG. 11 is an explanatory diagram illustrating signal D obtained by subtracting signal C from signal A according to Embodiment 2. Specifically, (a) in FIG. 11 is a schematic diagram illustrating the image based on signal D, and (b) in FIG. 11 is a waveform diagram illustrating a waveform of a signal level at a section taken along a line XIb-XIb in the image based on signal D.

Considering that both signals A and C are obtained as a result of image capturing in the exposure period of 0.5T, the signal levels of signal A and signal C in still object area h10, which is an area representing a still object, are the same, and thus still object area h10 is cancelled and becomes "0" in signal D obtained by subtracting signal C from signal A. An area indicating a value other than "0" represents a signal indicating an area in which an object motion is detected, i.e., a motion detection signal. The motion detection signal indicates moving object area h20 which is an area representing a moving object. Thus, background G becomes still object area h10, and object locus h3 from time 0 to time T becomes moving object area h20. An area other than moving object area h20 corresponds to still object area h10.

Thus, image processor 160 subtracts a reference image signal (signal A) from a last read-out image signal (signal B) in one exposure period L, and detects one of moving object area h20 and still object area h10 based on signal D obtained by subtracting the subtraction result (signal C) from the reference image signal (signal A), the reference image signal being an image signal read out before the last read-out image signal.

Note that in the case of reading out image signals N times or more within one exposure period L, a k-th (k=2 to N) read-out image signal is set as signal B and (k−1)th read-out image signal is set as signal A, and similar processing is sequentially repeated on k=2 to N.

In this case, signal D also includes noise superimposed on an image, in addition to moving object area h20. To obtain signal D as a pure motion detection signal, it is necessary to provide an appropriate threshold for signal D and forcibly set the value of data which is close to a level "0" to "0" to thereby suppress noise. The following description will be given assuming that signal D is a signal obtained after the above-described noise reduction processing is performed.

Figure 12:
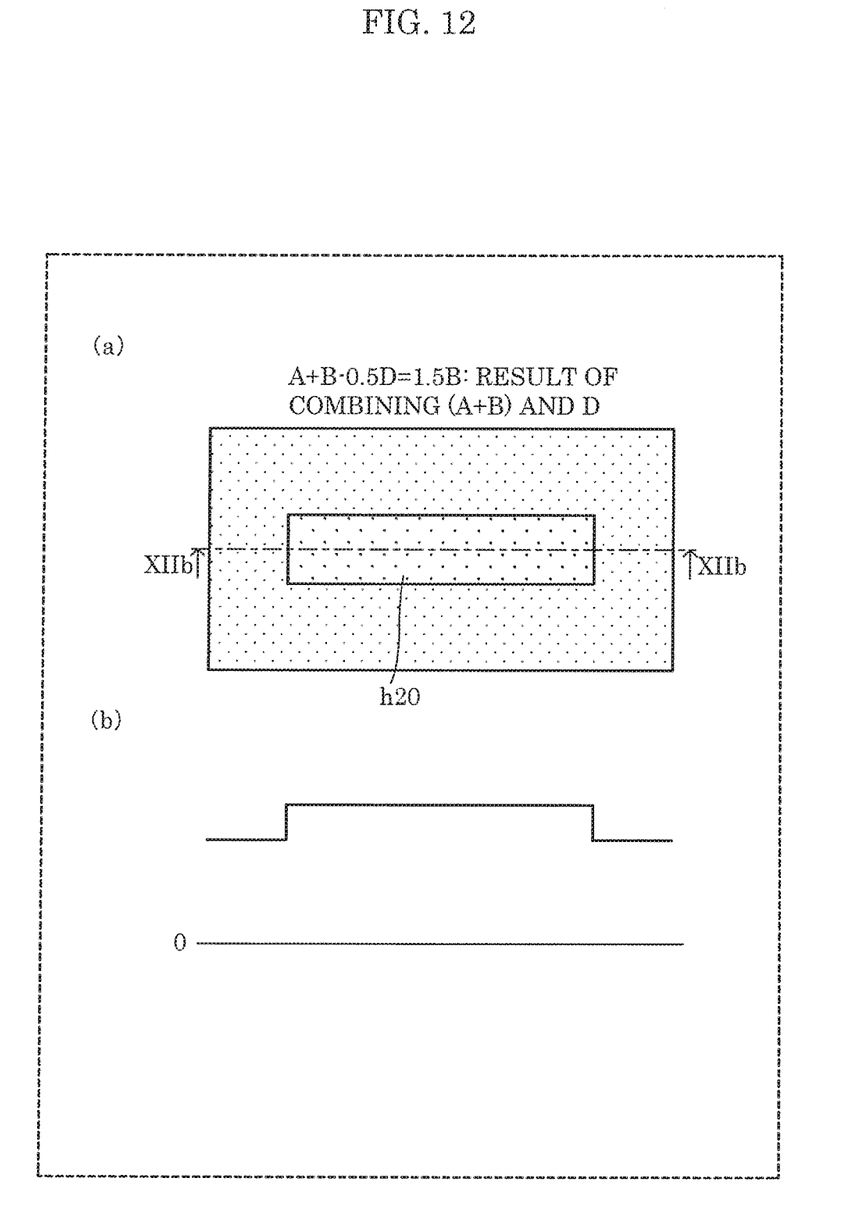
FIG. 12 is an explanatory diagram illustrating a result of multiplying signal D by a 0.5-fold gain and subtracting the multiplication result from signal (A+B) according to Embodiment 2.

FIG. 12 is an explanatory diagram illustrating a subtraction result obtained when signal D is multiplied by a 0.5-fold gain and subtracted from signal (A+B) according to Embodiment 2. Specifically, (a) in FIG. 12 is a schematic diagram illustrating an image based on the subtraction result, and (b) in FIG. 12 is a waveform diagram illustrating a waveform of a signal level at a section taken along a line XIIb-XIIb in the image based on the subtraction result.

When signal D obtained as described above is multiplied by the 0.5-fold gain and is subtracted from signal (A+B), D=0 holds in still object area h10, and thus the following Expression (5) is established.

$$A+B-0.5D=A+B \quad (5)$$

Further, the following Expression (6) is established in moving object area h20.

$$A+B-0.5D=A+B-0.5(A-C)=A+B-0.5(A-B+A)=A+B-A+0.5B=1.5B \quad (6)$$

Only moving object area h20 is replaced by an area obtained by multiplying signal B by a 1.5-fold gain. As a result, as illustrated in FIG. 12, discontinuity of the signal level in moving object area h20 is eliminated, so that a natural image capturing result can be obtained.

In the image obtained by the processing described above, noise reduction processing is performed on still object area h10. In this case, the added signal is obtained by adding up image signals read out a plurality of times with respect to still object area h10. On the other hand, in moving object area h20, signal B is only multiplied by the 1.5-fold gain. Accordingly, in moving object area h20, an improvement in S/N cannot be expected as compared with an imaging device of related art, but an image with an improved S/N can be obtained in still object area h10, like in Embodiment 1. Thus, image processor 160 distinguishes moving object area h20 from still object area h10 in each image signal, and performs noise reduction processing on still object area h10.

Specifically, an image including a difference in S/N between moving object area h20 and still object area h10 is obtained. However, since an image including a difference in S/N between moving object area h20 and still object area h10 is also obtained in general three-dimensional noise reduction processing on a moving image. Accordingly, it is considered that there is little feeling of strangeness.

Although the above embodiment illustrates an example in which object H moves at a constant speed, even when the object moves at an increased or decreased speed, the same concept is obtained only by changing a position where the value of the motion detection signal changes from a positive value to a negative value.

Further, the same concept is obtained also in Modified Examples 1 and 2.

Furthermore, to set S/N in moving object area h20 to be closer to S/N in still object area h10, two-dimensional noise reduction processing, such as LPF, may be locally performed only on moving object area h20, i.e., only on an area where signal D described above indicates a value other than "0".

The method of discriminating moving object area h20 from still object area h10 is not limited to addition or subtraction of signals A and B described above. Examples of other discrimination methods include a method of discriminating signals using a motion vector.

Supplementary Note

As described above, embodiments have been described as examples of the technique disclosed in this application. However, the technique disclosed in the present disclosure is not limited to these embodiments, and embodiments on which modifications, substitutions, additions, omissions, and the like are made as appropriate can also be applied.

(A) The present disclosure also includes an electronic device incorporating imaging device 1 according to Embodiments 1 and 2, as a matter of course.

As illustrated in FIG. 1, camera 100 includes imaging device 1 and optical system 110.

Optical system 110 includes optical elements such as zoom lens 111, hand shake correction lens 112, focus lens 113, and diaphragm 114, and focuses external light on imaging element 10.

Upon receiving an operation from a user, image processor 160 performs various signal processing on an output signal from imaging element 10, and records image data on memory card 200 inserted into card slot 190.

(B) It should be noted that the constituent elements (functional blocks) included in imaging device 1 are implemented into a Large Scale Integration (LSI) which is an integrated circuit. These may be integrated separately, or a part or all of them may be integrated into a single chip. The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured. Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

It should also be noted that a part or all of the above-described steps of the processing may be implemented by a hardware such as an electronic circuit or by software. The processing by software is implemented when a processor included in imaging device 1 executes a program recorded on a memory. The program may be recorded onto a recording medium and distributed. For example, it is possible that such a distributed program is installed in a device having another processor and executed by the other processor so as to allow the other processor to perform the above-described steps of the processing.

(C) In Embodiments 1 and 2, an organic MOS image sensor is described as an example of imaging element 10. As a MOS image sensor capable of global shutter driving, an image sensor which has a configuration in which electric charges generated in a photodiode are written into a non-volatile memory transistor and is capable of reading out data in a nondestructive manner, or a CCD image sensor or a CMOS image sensor to which a floating gate amplifier (FGA) is applied may also be used. Any imaging element may be used as long as the imaging element can output an image signal in a nondestructive manner during exposure.

Further, imaging element 10 may be integrally formed with A/D converter 150.

(D) In Embodiment 1, a deterioration in bit accuracy has been described by taking an example in which the target level is doubled, but the gain is not limited to the two-fold gain. In Embodiment 1, assuming that a $2^m$-fold (m>0) gain is set, a deterioration in bit accuracy can be obtained by Expression (7), and the deterioration in bit accuracy is m bits.

$$\log_2(2^{n+m}) - \log_2(2^n) = (n+m) - n = m \quad (7)$$

On the other hand, a deterioration in bit accuracy when image signals are read out twice in different exposure periods at the same exposure start time in one exposure period L can be obtained by Expression (8).

$$\log_2(2^{n+m}) - \log_2(1.5 \times 2^n) = (n+m) - (n+0.58) = m - 0.58 \quad (8)$$

Accordingly, the deterioration in bit accuracy can be reduced by 0.58 from m bits. Accordingly, noise can be reduced.

Further, a deterioration in bit accuracy when the exposure period in one exposure period L is equally divided, image signals are read out $2^c$ (c>1) times, and the target level is set to a 2c-fold value can be obtained by Expression (9).

$$\log_2(2^{n+c}) - \log_2((2^c+1)/2 \times 2^n) = \log_2(2^{n+c}) - \log_2((2^c+1) \times 2^{n-1}) \quad (9)$$
$$= (n+c) - (n-1) - \log_2(2^c+1)$$
$$= c - (\log_2(2^c+1) - 1)$$

Accordingly, the deterioration in bit accuracy can be suppressed by $\log_2(2^c+1)-1$ from c bits. Accordingly, noise can be reduced.

(E) Embodiment 1 has been described above assuming that, to simplify the explanation, the sensor receives object light with a constant (not variable) light reception amount within exposure period L, but the present disclosure is not limited to this. For example, noise can be reduced also in a case where the exposure amount rapidly changes during flash photographing, or at the time of getting out of a dark tunnel.

Figure 13:
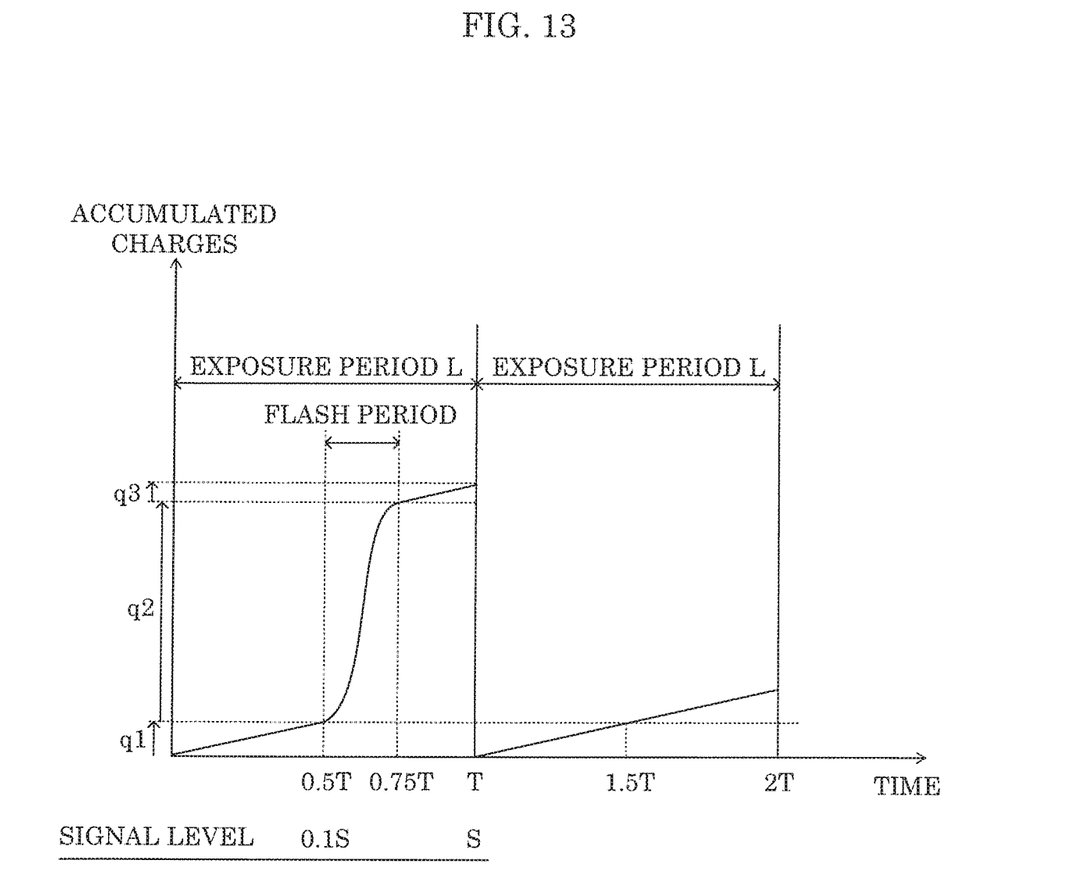
FIG. 13 is an explanatory diagram illustrating a read-out timing of an image signal during flash photographing at a dark portion.

FIG. 13 is an explanatory diagram illustrating a read-out timing of an image signal during flash photographing at a dark portion. FIG. 13 is a graph illustrating time and accumulated charges in a case where, in exposure period L, the signal level in the exposure period of 0 to 0.5T at the dark portion is 0.1S, flash photographing is performed in the exposure period from time 0.5T to time 0.75T, and it becomes dark again from exposure 0.75T. Assuming that the target gain value is doubled, a deterioration in bit accuracy can be obtained by Expression (10).

$$\log_2(2^{n+1}) - \log_2(1.1 \times 2^n) = (n+1) - (n+0.14) = 0.86 \quad (10)$$

Accordingly, the deterioration in bit accuracy can be reduced by 0.14.

Unless data is read out in a nondestructive manner in a special exposure period in which accumulated charges do not change at all in a part of exposure period L, the accumulated charges increase with time as indicated by q1, q2, and q3, although the accumulation speed of accumulated charges are different. Accordingly, image signals are read out a plurality of times in a nondestructive manner in exposure period L, thereby making it possible to reduce the deterioration in bit accuracy as compared with the case of reading out an image signal only once.

Note that even in a special exposure state in which the amount of accumulated charges does not change at all in a part of or the entire exposure period L, the level of the added signal obtained by adding up the image signals read out a plurality of times is higher than the level of last read-out image signal. Therefore, the effect of reducing the deterioration in bit accuracy can also be obtained.

Furthermore, modes implemented by arbitrarily combining components and functions described in the above-described Embodiments 1 and 2 are also included in the scope of the present disclosure.

As described above, Embodiments 1 and 2 have been described as examples of the technique disclosed in the present disclosure. Accordingly, the accompanying drawings and detailed descriptions are provided. Therefore, to exemplify the above-described technique, the components described in the accompanying drawings and detailed descriptions include not only essential components for solving the problems, but also components that are not essential for solving the problems. For this reason, it should not be recognized that the non-essential components are essential because the non-essential components are described in the accompanying drawings and detailed descriptions. Because Embodiments 1 and 2 described above are provided for exemplifying the technique in the present disclosure, various modifications, substitutions, additions, and omissions can be made within the scope of claims and equivalent scope of claims.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an imaging device capable of capturing a still image or a moving image. Specifically, the present disclosure can be applied to various imaging devices capable of capturing a still image or a moving image, such as a lens interchangeable digital camera, a compact digital camera, a digital video camera, a smartphone, a wearable camera, and a monitoring camera.

What is claimed is:
1. An imaging device comprising:
an image sensor that outputs an image signal in a nondestructive manner;
an image processor that performs predetermined processing on the image signal generated by the image sensor to generate image data; and
a control circuit that controls the image processor,
wherein, under control of the control circuit, the image processor reads out image signals from the image sensor a plurality of times within one exposure period, calculates a target gain value based on a target level and an added signal, and multiplies the added signal by the target gain value to generate the image data, the target level being calculated based on a signal level of a last read-out image signal in the one exposure period, the added signal being obtained by adding up the image signals read out the plurality of times.

2. The imaging device according to claim 1, wherein the image processor reads out each of the image signals at a timing obtained by equally dividing the one exposure period.

3. The imaging device according to claim 1, wherein assuming that the one exposure period is represented by L, the image processor reads out the image signals at a plurality of times in a period equal to or longer than L/2 of the one exposure period.

4. The imaging device according to claim 3, wherein assuming that a read-out period for reading each of the image signals is represented by Tr, the image processor sets a last read-out timing in the number of times of reading out the image signals in the one exposure period as a last time point in the one exposure period, and sets a read-out timing other than the last read-out timing to fall within a period equal to or longer than L/2 of the one exposure period and less than L−Tr.

5. The imaging device according to claim 1, wherein the image processor determines the number of times of reading out the image signals in a current exposure period based on the target gain value previously calculated.

6. The imaging device according to claim 1, wherein the image processor detects one of a moving object area and an area other than the moving object area in each of the image signals, and the added signal is obtained by adding up the image signals read out the plurality of times with respect to the area other than the moving object area.

7. The imaging device according to claim 6, wherein the image processor subtracts a reference image signal from a last read-out image signal in the one exposure period, and subtracts a result of the subtraction from the reference image signal, to detect one of the moving object area and an area other than the moving object area, the reference image signal being an image signal read out before the last read-out image signal.

8. A camera comprising:
the imaging device according to claim 1; and
an optical system including at least one optical element that focuses external light on the image sensor.

* * * * *